Dec. 9, 1930.   A. V. BEDFORD   1,784,653
AMPLIFIER
Filed Nov. 20, 1928
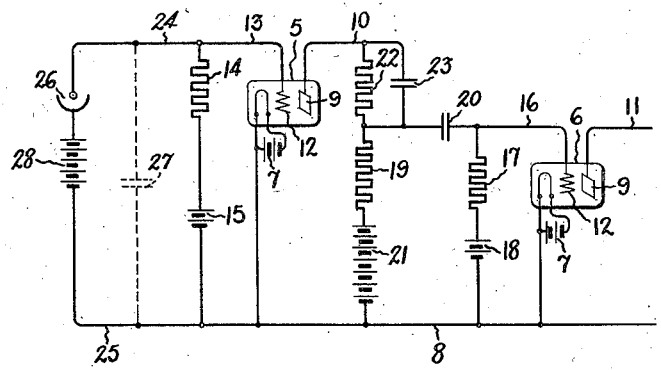
Inventor;
Alda. V. Bedford
by Charles E Mullar
His Attorney.

Patented Dec. 9, 1930

1,784,653

UNITED STATES PATENT OFFICE

ALDA V. BEDFORD, OF SCHENECTADY, NEW YORK, ASSIGNOR TO GENERAL ELECTRIC COMPANY, A CORPORATION OF NEW YORK

AMPLIFIER

Application filed November 20, 1928. Serial No. 320,701.

The present invention relates to amplifiers and more particularly to amplifiers embodying electric valves for use with photo-electric cells to amplify signals produced through such cells in apparatus wherein a high degree of fidelity of amplification of such signals is necessary.

A disadvantage heretofore experienced in the use of electric valve amplifiers, in conjunction with photo-electric cells, and like devices having high distributed capacity, has been the loss of amplification at the higher frequencies resulting in a distortion of signals therefrom and a loss of fidelity. This loss is occasioned for the most part by the distributed capacity of the cell and leads connected therewith.

It is therefore the principal object of the present invention to overcome this disadvantage and to provide a compensating or control means in conjunction with an amplifier for compensating for the effects of such distributed capacity, whereby even amplification and fidelity of output may be produced throughout a given frequency range, with an input or controlling device such as a photo-electric cell for applying a variable voltage to the input circuit.

The invention will be better understood from the following description when considered in connection with the accompanying drawing and its scope will be pointed out in the appended claims.

In the drawing, the figure is a wiring diagram of an amplifier connected with a photo-electric cell and provided with a compensating or control circuit embodying the invention.

Referring to the drawing, 5 and 6 are electric valves of any type suitable for use in an amplifier, and in the present example are three element electric valves having cathodes heated by a battery or other suitable means represented at 7 and connected with a common cathode return lead 8, anodes 9 connected with anode circuits 10 and 11, and control electrodes or grids 12. The grid of valve 5 is connected with an input or grid circuit 13 in which is located a grid bias resistor 14 and a source of bias potential 15, and the grid of valve 6 is provided with a similar grid circuit 16 in which are connected a grid bias resistor 17 and a source of bias potential 18.

Anode circuit 10 of valve 5 is provided with an anode resistor 19 which is connected at at its high A. C. potential end with the grid circuit 16 of tube 6 through a coupling capacitor 20, and receives its D. C. operating current from a suitable source such as a battery 21, connected between it and the cathode return lead 8.

Anode resistor 19, capacitor 20 and the grid bias resistor 17 provide a well known form of coupling means between the valves of an amplifier, the arrangement in the present example being such that voltage applied across the grid circuit 13 of the valve 5 is amplified thereby, and transmitted to the grid of the valve 6. Variations in the anode circuit 11 of the valve 6 corresponding to variations in grid voltage in grid circuit 13 are thus transmitted to apparatus (not shown), which may be connected with anode circuit 11.

Any suitable arrangement of this character may be provided in connection with the anode of valve 5. The essential feature being the provision of a load resistor or a load circuit including a resistor such as resistor 19, in connection with the anode, across which resistor a voltage proportional to the alternating current flow through it is developed, in response to signals applied to the grid circuit, the undistorted voltage being thereby available for application to a succeeding circuit or apparatus which in this case is the grid circuit 16 and tube 6.

Interposed between anode 9 and the load circuit which in this case includes anode resistor 19, is a resistor 22 and a capacitor 23 connected in shunt or parallel with each other, for purposes which will hereinafter appear.

Connected with grid circuit 13 through suitable leads 24—25, is an actuating or control device 26 for the amplifier, which device together with leads 24—25 has a relatively high distributed capacity indicated at 27. This capacity has substantially the same effect as a capacitor connected in shunt with the circuit and resistor 14. In the present example this device is represented as being a photo-electric cell provided with a suitable source of operating potential such as a battery 28.

The impedance of the grid resistor 14 is small compared with the internal impedance of the cell. The distributed capacity 27 which is in effect shunted across the cell and the grid circuit 13, permits more current to be by-passed around the grid resistor 14 and the coil circuit 13 at the higher frequencies, so that the current through the grid bias resistor 14 becomes less at the higher frequencies. Therefore voltages impressed upon the grid of the valve 5 also become less at the higher frequencies, as shown in the equation $$\#1— \quad E_1 = \frac{I_1}{\frac{1}{R_1} + jwC_1}$$

in which $E_1$ = the voltage impressed across grid circuit 13
$I_1$ = the alternating or signal current flowing in the photo-electric cell
$\frac{1}{R_1}$ = the conductance of grid bias resistor 14
$j$ = a constant
$w = 2\pi$ times the frequency
$C_1$ = distributed capacity 27

The purpose of the resistor 22 and shunt capacitor 23 in anode circuit 10 is to compensate for the above described falling off in voltage at the higher frequencies. This result is accomplished by making the impedance of anode resistor 19 relatively small with respect to the combined impedance of resistor 22 and capacitor 23, so that the signal current or A. C. component of the current through resistor 19 is controlled by resistor 22 and capacitor 23.

With this arrangement the voltage then applied to the grid circuit of the succeeding valve, in this case tube 6 and grid circuit 16, may be expressed in the equation $$\#2— \quad E_2 = ME_1 \left( \frac{1}{R_2} + jwC_2 \right) R_3$$

in which M = the effective amplification factor of valve 5,
$\frac{1}{R_2}$ = the conductance of resistor 22,
$C_2$ = the capacity at 23,
$R_3$ = the resistance of anode resistor 19, and the remaining factors are the same as in preceding equation #1.

Substituting in equation #2 the value for $E_1$ of equation #1, the following equation results $$\#3— \quad E_2 = \frac{K_1 I_1}{\left( \frac{1}{R_1} + jwC_1 \right)} \left( \frac{1}{R_2} + jwC_2 \right) R_3 = \frac{K_2 I_1 \left( \frac{1}{R_2} + jwC_2 \right)}{\left( \frac{1}{R_1} + jwC_1 \right)}$$

in which $K_1$ and $K_2$ = constants.

From the latter part of equation #3 above, it is apparent that if $$\frac{1}{R_2}$$

and $C_2$ are made to have the same ratio as $$\frac{1}{R_1}$$

and $C_1$, the distorting effect or loss of voltage amplification at high frequencies occasioned by the presence of distributed capacity 27 will be compensated. Stated in another way distortion caused by distributed capacity $C_1$ will be compensated when $$\frac{\frac{1}{R_1}}{\frac{1}{R_2}} = \frac{C_1}{C_2}$$

From the foregoing it will be seen that the compensating means represented by the resistor 22 and shunt capacitor 23, inserted in the anode circuit of valve 5, between the anode and a load circuit including a resistor such as resistor 19, must bear a certain definite relation to the resistance and distributed capacity in the grid or input circuit of the valve 5. This relation is such that the conductance of the shunt resistance in the grid circuit is to the conductance of the inserted resistance between the anode and load circuit as the shunt distributed capacity of the grid circuit is to the shunt capacity across said inserted resistance, such shunt capacity and resistance being connected therein between the anode and the load circuit to control the alternating current flow therethrough.

This arrangement when applied to television apparatus embodying a photo-electric cell, substantially as shown, has resulted in substantially uniform response and amplification of signals generated in the photo-electric cell over a wide range of frequencies.

While this compensating or current control circuit has been shown in conjunction with a two tube amplifier, it should be understood that it may be inserted at any point in an amplifier between an input circuit in which the distributed capacity effects a reduction of signal voltage at higher frequencies, and a load circuit from which undistorted signals are required, and is particularly adapted for use in conjunction with resistance coupled amplifiers which at present are finding extensive use in photo-electric and television apparatus.

What I claim as new and desire to secure by Letters Patent of the United States, is:

1. The combination of an electric valve provided with input and output circuits, means including a device possessing capacitance arranged to apply a variable voltage to said input circuit, and impedance means connected in said output circuit for neutralizing the effect of variation in the frequency of said input voltage on the current of said output circuit.

2. The combination of an electric valve provided with input and output circuits, means including a photo-electric cell arranged to apply a variable voltage to said input circuit, and alternating current controlling means having a relatively high impedance with respect to said output circuit connected in said output circuit for neutralizing the capacitative effect of said cell on the current of said output circuit.

3. The combination of an electric valve provided with input and output circuits, input voltage control means including an input resistor and a device possessing capacitance connected in parallel with said resistor, and impedance means connected in said output circuit for neutralizing the effect of change in the frequency of said input voltage on the current of said output circuit, said impedance means having a relatively high impedance value with respect to the impedance of the output circuit.

4. In combination, an electric valve having an input circuit and an output circuit, relatively high distributed capacity control means connected in said input circuit and compensating means connected in said output circuit for neutralizing the effect of said capacity upon load current flow in said output circuit, said compensating means comprising a current control resistor and a current control capacitor connected in shunt with said current control resistor.

5. The combination with an amplifier including successive circuits and electric valves interposed between said circuits, of means including a resistor and a capacitor connected in parallel with one another and connected in series with one of said circuits to control the signal current flowing therethrough, said resistor having a conductance ratio with respect to the resistance of another of said circuits substantially equal to the ratio of the value of said shunt capacitor with respect to the value of the distributed capacity of said other circuit.

6. In a resistance coupled amplifier embodying electric valves, the combination of a grid circuit having a relatively high distributed capacity, a grid resistor in said circuit across which said capacity forms substantially a shunt connection, a load circuit, a load resistor in said circuit, a current control resistor connected in said load circuit, and a current control capacitor shunting the control resistor, the ratio between the conductance values of the grid and control resistors being substantially equal to the ratio between the value of said distributed capacity and that of the shunt control capacitor.

7. In a resistance coupled amplifier including an electric valve, the combination of a capacitative grid circuit connected between the grid and cathode of one of said valves, a grid resistor connected across said grid circuit, a load circuit connected with the anode of said valve, a load resistor in said circuit, a current control resistor connected in said circuit between said load resistor and said anode, and a current control capacity shunting the control resistor, the ratio of the conductances of said grid and control resistors being substantially equal to the ratio of said grid circuit and shunt control capacities and the resistance value of said control resistor being greater than that of the load resistor.

In witness whereof, I have hereunto set my hand this 19th day of November, 1928.

ALDA V. BEDFORD.

DISCLAIMER 1,784,653.—*Alda V. Bedford*, Schenectady, N. Y. AMPLIFIER. Patent dated December 9, 1930. Disclaimer filed August 4, 1934, by the assignee, *General Electric Company*.

Hereby enters the following disclaimer to claims 1, 2, 3, and 4 of the said Letters Patent, which are in the following words, to wit:

"1. The combination of an electric valve provided with input and output circuits, means including a device possessing capacitance arranged to apply a variable voltage to said input circuit, and impedance means connected in output circuit for neutralizing the effect of variation in the frequency of said input voltage on the current of said output circuit.

"2. The combination of an electric valve provided with input and output circuits, means including a photo-electric cell arranged to apply a variable voltage to said input circuit, and alternating current controlling means having a relatively high impedance with respect to said output circuit connected in said output circuit for neutralizing the capacitative effect of said cell on the current of said output circuit.

"3. The combination of an electric valve provided with input and output circuits, input voltage control means including an input resistor and a device possessing capacitance connected in parallel with said resistor, and impedance means connected in said output circuit for neutralizing the effect of change in the frequency of said input voltage on the current of said output circuit, said impedance means having a relatively high impedance value with respect to the impedance of the output circuit.

"4. In combination, an electric valve having an input circuit and an output circuit, relatively high distributed capacity control means connected in said input circuit and compensating means connected in said output circuit for neutralizing the effect of said capacity upon load current flow in said output circuit, said compensating means comprising a current control resistor and a current control capacitor connected in shunt with said current control resistor."

[*Official Gazette September 11, 1934.*]